United States Patent Office 3,496,177
Patented Feb. 17, 1970

3,496,177
PROCESS OF PURIFYING MELAMINE
Johan W. Hoogendonk, Geleen, Johannis L. M. Jacobs and Theodorus J. Brans, Stein, Netherlands, assignors to Stamicarbon N.V., Heerlen, Netherlands
No Drawing. Filed June 24, 1968, Ser. No. 739,163
Claims priority, application Netherlands, June 23, 1967, 6708749
Int. Cl. C07d 55/24
U.S. Cl. 260—249.7      6 Claims

ABSTRACT OF THE DISCLOSURE

A process for purifying crude melamine is disclosed, wherein melamine crystals are dissolved in water at a temperature below 110° C. the aqueous melamine solution is filtered at a temperature below 110° C., and at a pH value between 6 and 8, the melamine is separated from the filtrate by crystallization, and then fine crystals are separated from the melamine crystals.

BACKGROUND OF THE INVENTION

In a process for preparing melamine from urea, urea or a product resulting from the thermal decomposition of urea, is heated in the presence of ammonia and a catalyst, after which an ammoniacal melamine solution is obtained from the resultant gaseous mixture through absorption of this gaseous mixture in water. After removal of suspended undissolved impurities by filtration, the melamine present in the remaining solution is crystallized and subsequently separated from the mother liquor. However, the crude product obtained in this way does not possess the degree of purity required for all applications. Contaminating by-products are, among others, ammeline, ammelide, and melamine cyanurate. Some impurities, which occur in the melamine in minute, but disturbing quantities, are of unknown nature.

It has been proposed to use for the further purification of this crude melamine a recrystallization process in which the crude melamine is dissolved, sometimes after having been treated with a dilute alkali hydroxide solution, and subsequently vacuum and/or cooling crystallization is applied—after addition of a clarifying agent and after clarifying filtration—to separate the melamine crystals from the resulting solution. The melamine purified in this way does not possess the required degree of purity, which is reached as soon as the "formaldehyde test" gives a completely clear solution. The "formaldehyde test" consists in that 26 grammes of melamine is dissolved in 50 grammes of formaldehyde at a temperature of 85° C.; the clarity of the resulting solution is a measure of the purity of the melamine examined. If the purification is carried out by the abovementioned conventional method, the formaldehyde solution remains somewhat turbid, which is an indication that the melamine crystals do not yet possess the required degree of purity.

SUMMARY OF THE INVENTION

Melamine of high purity is produced by the thermal treatment of urea, if the resultant melamine is treated in accordance with certain purification steps. The crude melamine crystals, obtained from the synthesis reaction, are dissolved in water at a temperature of less than 110° C. to form an aqueous melamine solution. This solution is filtered at a temperature below 110° C. and a pH value of between 6 and 8, the filtrate is subjected to a crystallization step to separate melamine, and thereafter, if necessary, fine crystals are separated from the melamine crystals. These fine crystals are of a particle size which is generally less than ⅕ the particle size of the melamine crystals.

DETAILED DESCRIPTION OF THE INVENTION

It has now been found that clarifying filtration followed by recrystallization can produce melamine of the required purity if the crude melamine to be purified is dissolved in water at a temperature below 110° C., this solution is filtered at a temperature below 110° C., and at a pH value between 6 and 8. Thereafter melamine is separated from the filtrate by crystallization, and subsequently, if necessary, the melamine crystals are subjected to a further treatment wherein the melamine crystals that have been isolated are separated from finer crystals (small particle size) containing contaminating by-products.

In order to purify melamine by the process according to the invention, two interconnected measures are essential, viz.:

(1) The temperature of 110° C. must by no means be exceeded during the formation of the aqueous melamine solution and the subsequent filtration thereof; and (2) The pH value of 6–8 must be maintained during filtration.

Provided these requirements are satisfied, contaminating by-products can be separated out by: (1) clarifying filtration; followed, if necessary, by (2) separation of melamine crystals from finer crystals.

Each of these measures of temperature and pH control by itself does not produce the desired result in the filtration and separation of the crystals. Melamine is not easily dissolved in water, so that for effecting this solution the highest possible temperature is generally chosen. However, in the filtration the temperature should not exceed 110° C. It has further been found that if melamine is dissolved at a temperature above 110° C. and the resulting solution is cooled to below 110° C., part of the contaminating by-prducts will remain dissolved, and therefore the solution temperature must not exceed 110° C. during the dissolving of the melamine. Combination of the temperature control with adherence to a pH value between 6 and 8 causes a suppression of the water-solubility of a number of the compounds that produce turbidity in the "formaldehyde test," so that at least part of these compounds are not dissolved and can be separated from the filtrate in the clarifying filtration. It has further been found that the contaminating by-products remaining in solution, especially ammeline, ammelide and melamine cyanurate, form considerably smaller crystals than melamine upon crystallization at the pH value of between 6 and 8 to which the solution has been adjusted. Removal of these smaller crystals produces a further purification of the melamine.

The correction of the pH to a value of 6–8 is effected through addition of a reagent having an acid reaction. This is because, owing to the nature of its preparation, the crude melamine generally contains a little free ammonia, so that the value of the pH of the solution is normally higher than 8. Owing to the fact that in the melamine preparation mother liquor is recirculated, this value is further raised. The addition of an acid renders it possible to lower the pH value. As with inorganic strong acids, e.g., sulphuric acid or nitric acid, melamine produces salts of poor solubility, a weak acid, for instance acetic acid, is preferably added to the solution. However, most preferably the adjustment of the pH to the correct value is made by introduction of $CO_2$ into the solution.

The average particle size of the melamine crystals is about twenty times the average particle size of the contaminating crystals so that the separation or removal of such fine crystals generally proceeds without much difficulty. The separation of the crystals is conveniently accomplished in a hydrocyclone (such as illustrated in Perry, "Chemicals Engineers Handbook" 3rd edition, McGraw-Hill, N.Y. 1950, especially at page 1036, the disclosure of which is hereby incorporated by reference) which has been found satisfactory to separate all particles which in size are ⅕ or smaller the size of the average melamine crystals.

EXAMPLES OF THE INVENTION

The invention will be understood more readily by reference to the following examples; however, these examples are intended to illustrate the invention and are not to be construed to limit the scope of the invention.

Example 1

Crude melamine was produced by the thermal decomposition of urea in the process disclosed in U.S. Patent No. 3,210,352. The crude melamine crystals were dissolved in water which was maintained at about approximately 105° C. The resulting solution contained about 4% melamine by weight. The pH of the aqueous melamine solution was adjusted to about 7.2 by bubbling carbon dioxide through the solution. The adjusted aqueous solution was then filtered on a drum filter. The filtrate from the filtering operation was subjected to a cooling crystallization step wherein the solution was reduced to 50° C., and the melamine in the solution crystallized.

The melamine crystals were separated from the filtrate by a second filtration operation, and thereafter the melamine crystals were passed through a hydrocyclone to remove all fine crystals of an average particle size of ⅕ or smaller than that of the average particle size of the melamine crystals (150 microns).

The purified melamine crystals produced a completely clear solution when subjected to the "formaldehyde test."

Example 2

To further illustrate the invention a table is given of some test results relating to a "formaldehyde test" carried out with melamine treated in the manner of Example I, which melamine had been obtained from a solution of crude melamine prepared at 105° C. The pH of which solution was brought to different values prior to the clarifying filtration by the introduction of $CO_2$. For the "formaldehyde test" quantities of 26 grammes of melamine were dissolved in 50 grammes of formaldehyde at a temperature of 85° C. The clarity of the solution thus obtained was determined visually.

| pH of solution: | "Formaldehyde test" after filtration |
|---|---|
| 8.60 | Turbid. |
| 8.35 | Do. |
| 8.25 | Do. |
| 8.20 | Do. |
| 8.00 | Slightly turbid. |
| 7.60 | Clear. |
| 6.85 | Do. |

When the crude melamine was dissolved at a temperature of 130° C. and filtered at that temperature, the "formaldehyde test" showed turbidity also for the three last-mentioned pH values of the solution, which indicates that the required degree of purity was not reached. Even when the solution dissolved at 130° C. was filtered at 105° C. and a pH of 6.85, the "formaldehyde test" gave a slight degree of turbidity.

Obviously many modifications and variations of the present invention are possible in the light of the above teachings.

What is claimed is:

1. In a process of purifying crude melamine obtained by the thermal treatment of urea, said process comprising the steps of forming an aqueous solution of crude melamine from gaseous melamine, subjecting the aqueous crude melamine solution to clarifying filtration, and thereafter crystallizing the melamine from the filtrate and separating the melamine crystals from the filtrate, the improvement consists essentially of dissolving said melamine crystals in water at a temperature below 110° C., filtering the aqueous crude melamine solution at a temperature below 110° C. while maintaining the pH of the aqueous crude melamine solution between 6 and 8, separating the melamine from the filtrate by crystallization.

2. Processing of purifying crude melamine obtained by the thermal treatment of urea, said process comprising the steps of forming an aqueous solution of crude melamine from gaseous melamine subjecting the aqueous crude melamine solution to clarifying filtration, and thereafter crystallizing the melamine from the filtrate and separating the melamine crystals from the filtrate, the improvement consists essentially of dissolving said melamine crystals in water at a temperature below 110° C., filtering the aqueous crude melamine solution at a temperature below 110° C. while maintaining the pH of the aqueous crude melamine solution between 6 and 8, separating the melamine from the filtrate by crystallization, and thereafter separating the melamine crystals from the finer impurity crystals.

3. Process as claimed in claim 1, wherein the pH of the aqueous crude melamine solution is maintained by the addition of a weak acid.

4. Process as claimed in claim 1, wherein the pH of the aqueous crude melamine solution is maintained by the addition of carbon dioxide into said solution.

5. Process as claimed in claim 2, wherein the melamine crystals are separated from the impurity crystals which are of an average particle size of ⅕ or less than the average particle size of the melamine crystals.

6. Process as claimed in claim 5, wherein the melamine crystals and the impurity crystals are separated by passage through a hydrocyclone.

References Cited

UNITED STATES PATENTS

| 3,321,477 | 5/1967 | Hyman et al. | 260—249.7 |
| 3,454,571 | 7/1969 | Kokubo et al. | 260—249.7 |

HENRY R. JILES, Primary Examiner

JOHN M. FORD, Assistant Examiner